March 24, 1964    G. W. BOWERS, JR., ETAL    3,126,149
FOAMED ALUMINUM HONEYCOMB ROTOR RUB-IN SHROUD
Filed May 8, 1961
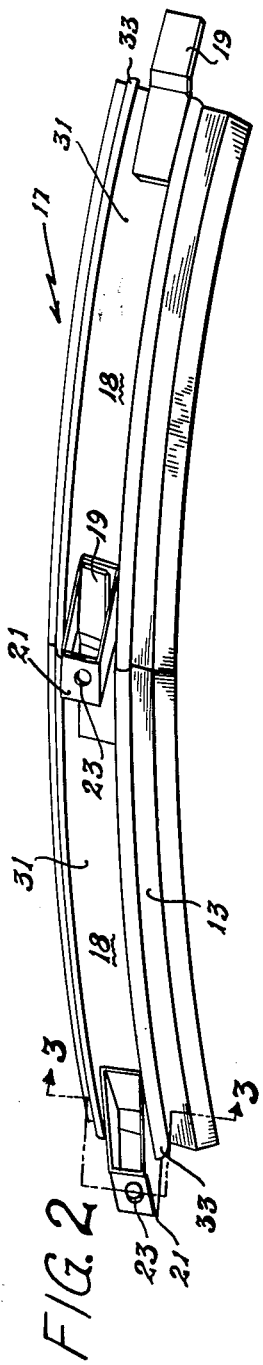
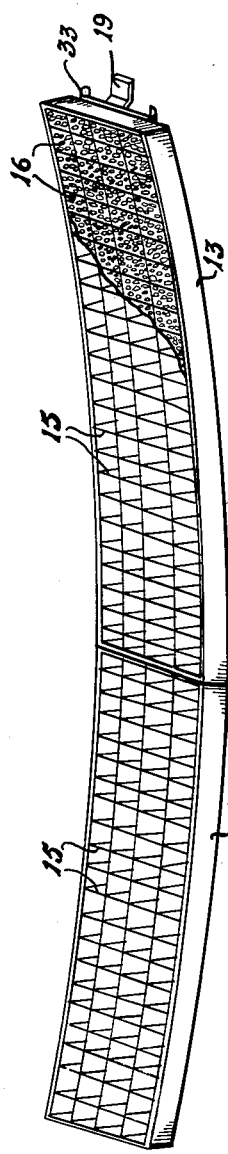
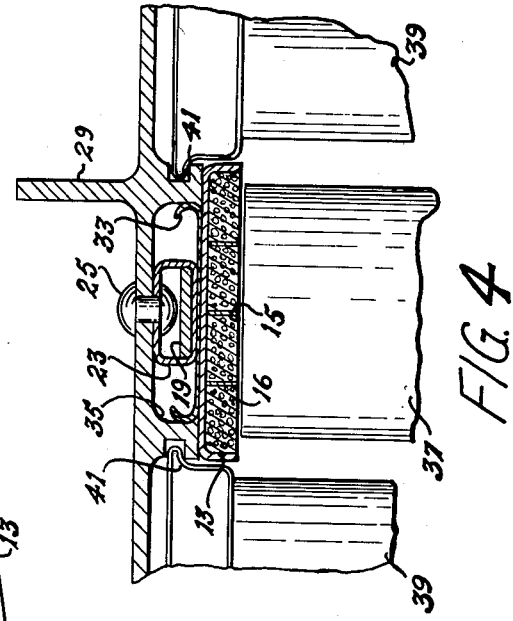
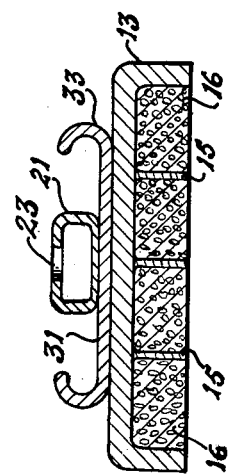
INVENTORS
GRADY W. BOWERS JR.,
LEVAR C. JENSEN
BY WILLIAM A. HARRIS
ATTORNEYS

3,126,149
FOAMED ALUMINUM HONEYCOMB ROTOR RUB-IN SHROUD

Grady W. Bowers, Jr., El Cajon, Calif., Le Var C. Jensen, Cincinnati, Ohio, and William A. Harris, Topsfield, Mass., assignors to the United States of America as represented by the Secretary of the Air Force
Filed May 8, 1961, Ser. No. 108,977
2 Claims. (Cl. 230—133)

This invention relates to an improved compressor stator assembly for use in a turbojet engine and is more particularly concerned with providing a structural arrangement whereby a negative rotor blade tip clearance on assembly is permissible by utilizing a special material for construction of the compressor shrouds thereby resulting in zero operating clearance and increased compressor efficiency.

The operating efficiency of a turbojet engine is dependent upon a great number of variable parameters. Among the most significant variables which determine the overall performance of the engine is the individual operating efficiency of the turbine and compressor components. One of the most fruitful areas of compressor efficiency increase lies in the reduction of radial clearances of the rotor blades. This is particularly true in the compressor portion of engines having relatively short rotor blades because the effect of clearance on performance would necessarily be a function of the percentage of the blade height.

On past engine designs, it has been conventional to allow a substantial clearance space between the outer tip of the compressor rotor blades and the shrouds of the stator assembly. This is necessary because even a slight rubbing of rotor blades on the compressor casing lining generally results in serious engine damage and failure. Heat produced by the friction of rubbing causes distortion which in turn produces more rubbing and eventually will cause a failure if permitted to continue. Thus, it can be seen that rotor blade clearance is an important and essential consideration in jet engine efficiency and design and the retention of this clearance at a safe minimum value would result in greatly improved performance.

It is extremely difficult to maintain the compressor blade clearance at the desired minimum in service, because of the differential expansion of the various engine parts, elastic deformations caused by stress and vibration present in the operating engine, wear of the bearings and shaft which support the rotor blades, and ordinary manufacturing and assembly errors. Expensive machining operations have heretofore been required in order to obtain the necessary accuracy of parts so that clearances are sufficient to prevent actual metal-to-metal contact while retaining minimum operating clearances between the blade tips of each rotor stage and its corresponding shroud.

Accordingly, it is a principal object of the present invention to simplify the construction of a turbojet engine, at the same time improving the operation, efficiency and dependability of the engine.

Another object of the invention resides in the provision of a turbojet engine wherein the compressor section includes a casing liner made up of a material which possesses the desired features of abradability as well as resistance to changes in physical properties at temperatures of up to 1050° and higher.

Still another object of the invention is to provide a compressor casing liner which includes a skeletal reinforcing framework having a honeycomb structure into which a foamed mixture of sodium silicate and aluminum is inserted. The framework acts to support the relatively low strength foamed aluminum.

A still further object of the invention is to provide means on the compressor casing liner for its attachment by riveting to the outer casing of jet engine. By attaching the casing liner in this manner, the final assembly of the stator can be easily machined to give perfect concentricity and a smooth rub-in surface.

Another still further object of the invention is to provide effective means in the compressor section of a turbojet engine to overcome and prevent a grabbing or seizing of the compressor rotor onto the casing liner surfaces of the stator shroud when the engine is operated at accelerated speeds as required in present day high performance aircraft.

These and other objects, features, and advantages will become apparent to those skilled in the art from the following description taken in conjunction with the illustrative embodiment shown in the accompanying drawings wherein:

FIG. 1 is a view in perspective of the skeletal honeycomb framework of the compressor casing lining before the insertion of all of the foamed material to form one of the shrouds used in a multi-stage turbojet compressor;

FIG. 2 is a view in perspective of two sections of the compressor shroud showing the brackets for joining the separate sections to each other and to the outer engine casing;

FIG. 3 is a view in section taken along the line 3—3 of FIG. 2 and shows the sealing arrangement as well as the attaching bracket and honeycomb configuration; and FIG. 4 is a view in section of a turbojet compressor in the area of the outer tip of the rotor blade and shows the seal and attachment bracket in position and includes a fragmentary indication of the relative position of the adjacent stator blades.

Referring to the drawing, in FIG. 1 there is shown two sections of the compressor casing lining 13 formed in the shape of a honeycomb structure 15 arranged to receive a foamed material 16, preferably a mixture of aluminum and sodium silicate. The size and shape of the honeycomb structure 15 may vary and is designed to form the mechanical support serving to retain the foamed material 16 in position on the shroud section 17 made up of a series of arcuate members 18. The skeletal framework also gives the lining member 13 the ability to withstand the forces of rubbing and gas erosion encountered during normal and abnormal operation of the compressor section of the turbojet engine.

At one end of each of the arcuate members 18, there is attached a bracket 19, shown most clearly in FIG. 2. A mating bracket 21 is attached to the other end of each of the members and is dimensioned to receive the bracket 19 and serves to retain the adjacent shroud section in a fixed relative position. An aperture 23 is provided in each of the mating brackets 21 through which a rivet 25 may be inserted. A corresponding aperture 27 is formed in the outer casing 29 of the turbojet engine allowing the body of the rivet 27 to be inserted thereinto after passing through the aperture 23. On assembly, the rivet 27 is headed over thereby fixedly attaching the compressor shroud 17 to the engine outer casing 29.

A seal 31 is affixed to the lining member 13 and is provided with curved end portions 33 which rest against shoulders 35 in the engine outer casing 29. The seal 29 operates to prevent the leakage of compressed gases from inside the compressor so that the hot gases cannot impinge on the outer casing of the engine.

In FIG. 4 there is shown a cross-sectional view of the area of the compressor near the tip of the rotor blade 37. Adjacent stators 39 are also shown including the grooves 41 into which the base portions of the stator vanes 39 are inserted. It will be noted that little or no clearance space is required between the tip of the rotor blade 37 and the shroud liner 13.

In operation, the invention is of primary utility in improving the assembly procedure of a turbojet engine. The honeycomb liner 13 filled with foamed metal 16 is made up in annular sections formed from a series of arcuate members which, when joined end-to-end, become the circular shroud section. These members 18, having brackets 19 and 21 attached, are riveted to the outer casing 29 between the stator vanes 39 and form the compressor shroud 17. When assembled, the members interlock and mutually support each other in the unit. Perfect concentricity and a smooth finish is imparted to the casing liner after assembly by a relatively simple machining operation.

The relative dimensions of the compressor rotor blade 37 and the machined shroud 17 are chosen so that a negative clearance results when the unit reaches operating temperatures. This means that there will be a slight interference or rubbing action between the rotor blade and the casing liner 13. Because of the unique construction of the compressor shroud 17 in the form of a honeycomb structure 15 with the light weight foamed material 16 inserted thereinto, the rubbing of the elements operates to further smooth the surface of the shroud and allows for substantially zero running clearance without the risk of danger resulting from compressor rotor or shroud failure.

The easily abraded surface of the compressor shroud 17 permits the rubbing of the rotor blades 37 during transient conditions when the compressor rotor is under excessive load or has been subjected to undue wear conditions such as high vibrations. This allows unusually close clearance at operating points with the resulting increase in performance characteristics. When rubbed, the foam material 16 which is used to fill the honeycomb structure 15 is resistant to chipping or gouging because of the support of the honeycomb structure 15 and its inherent ability to smear into a smooth surface. This ability also serves a useful purpose when the shroud 17 is concentrically machined providing a smooth initial rubbing surface for the rotor blade tips.

The surface of the compressor casing lining 13 does not erode at the pressures, temperatures and air velocities normally encountered in a turbojet engine. The foamed material, such as a mixture of sodium silicate and aluminum, would, therefore, appear to be useful for other applications where similar features and advantages would be desirable and important. Also, the low density foamed material in combination with the honeycomb skeletal framework results in an unusually light weight yet rugged construction which is extremely important in the design problems associated with present day high performance aircraft.

It is to be understood that our invention as disclosed herein is by way of illustration of specific embodiments thereof and not by way of limitation. For example, the foamed material has been described as being a mixture of a particular compound and a particular element. However, it is easily seen that other materials having the desired properties could be substituted for the one described without departing from the principles of the invention disclosed herein.

Therefore, having described and illustrated certain preferred embodiments of our invention, various changes and modifications of these embodiments may be made without departing from the true spirit of the invention as defined in the appended claims.

What we claim is:

1. An axial-flow compressor for use in a turbojet engine, said compressor comprising, a rotor assembly having a plurality of circumferentially extending rows of blades thereon, an outer casing surrounding said rotor assembly, said outer casing being provided with a plurality of annular shroud sections on the inner wall thereof, each of said shroud sections forming a lining in axial alignment with a corresponding row of rotor blades, said lining having a skeletal framework of honeycomb configuration on the inner face thereof, a foamed material consisting of a mixture of sodium silicate and aluminum insertable into openings in said honeycomb lining to form an abrading surface thereon, said foamed material having a melting point higher than the temperatures generated during operation of said turbojet engine, each of said annular shroud sections being comprised of a series of arcuate members joined together at their terminal ends, each of said arcuate members having an upstanding open rectangular cross section bracket fixedly attached to one terminal end thereof for interlocking engagement with a flat projecting mating bracket fixedly attached to the opposite terminal end of the next adjacent arcuate member for mutually supporting said members to form said annular shroud, and means for attaching said arcuate members to the inner wall of said compressor outer casing such that a negative clearance exists between the outermost peripheral portion of said circumferentially extending rotor blades and the inner surface of said arcuate members during initial operation of said compressor and substantially zero clearance exists under normal operating conditions of the turbojet engine.

2. The axial-flow compressor defined in claim 1 wherein said annular shroud section includes means for sealing an area between the outer surface of said shroud and the inner wall surface of said compressor outer casing to prevent impingement of hot gases on said casing with the resulting erosive effect thereon, said sealing means comprising a lining member affixed to the outer surface of each of said annular shroud sections, curved end portions disposed along the circumferential edges of said lining members, said curved end portions engaging corresponding shoulder sections on the inner wall of the engine outer casing.

References Cited in the file of this patent

UNITED STATES PATENTS

| 2,127,372 | Victor et al. | Aug. 16, 1938 |
| 2,879,936 | Faught | Mar. 31, 1959 |
| 2,962,809 | Short et al. | Dec. 6, 1960 |
| 2,963,307 | Bobo | Dec. 6, 1960 |
| 3,000,552 | Cooper et al. | Sept. 19, 1961 |
| 3,010,843 | Eder | Nov. 28, 1961 |
| 3,024,968 | Payne et al. | Mar. 13, 1962 |
| 3,042,365 | Curtis et al. | July 3, 1962 |
| 3,053,694 | Daunt et al. | Sept. 11, 1962 |
| 3,056,583 | Varadi | Oct. 2, 1962 |
| 3,068,016 | Dega | Dec. 11, 1962 |

FOREIGN PATENTS

| 793,886 | Great Britain | Apr. 23, 1958 |
| 851,323 | Great Britain | Oct. 12, 1960 |